(12) United States Patent
Koch

(10) Patent No.: US 10,310,329 B2
(45) Date of Patent: Jun. 4, 2019

(54) DISPLAY UNIT AND METHOD FOR PRODUCING A DISPLAY UNIT

(71) Applicant: Marcus Koch, Karlsruhe (DE)

(72) Inventor: Marcus Koch, Karlsruhe (DE)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/289,184

(22) Filed: Oct. 9, 2016

(65) Prior Publication Data

US 2017/0102587 A1    Apr. 13, 2017

(30) Foreign Application Priority Data

Oct. 9, 2015   (DE) .................. 10 2015 117 234

(51) Int. Cl.
*G09F 9/35* (2006.01)
*G02F 1/1333* (2006.01)
*G02F 1/1335* (2006.01)
*G02F 1/1368* (2006.01)

(52) U.S. Cl.
CPC ...... *G02F 1/133608* (2013.01); *G02F 1/1368* (2013.01); *G02F 1/133308* (2013.01); *G09F 9/35* (2013.01); *G02F 2001/133314* (2013.01); *G02F 2001/133317* (2013.01); *G02F 2201/50* (2013.01)

(58) Field of Classification Search
CPC ................ G02B 6/0081; G02B 6/0095; G02F 2001/133314; G02F 2001/133317; G02F 1/133608; G02F 2201/46; G02F 2001/133328; G02F 2001/13332; G02F 2202/28; G02F 1/1333; G02F 2201/465
USPC .................................................. 362/600–634
See application file for complete search history.

(56) References Cited

U.S. PATENT DOCUMENTS

| | | | |
|---|---|---|---|
| 8,388,211 B2 * | 3/2013 | Chen ................. | G02F 1/133608 362/615 |
| 2012/0113351 A1 * | 5/2012 | Cheng .............. | G02F 1/133308 362/382 |

FOREIGN PATENT DOCUMENTS

| | | |
|---|---|---|
| DE | 10 2009 048 682 A1 | 4/2011 |
| WO | 2015/067244 A1 | 5/2015 |

* cited by examiner

*Primary Examiner* — William J Carter
(74) *Attorney, Agent, or Firm* — Quinn IP Law

(57) ABSTRACT

The aspects disclosed herein relate to a display unit and a method for producing a display unit, is to provide a display unit which is easy to produce and is not susceptible to compressive and tensile stresses acting on the protective housing. This object is achieved in that the TFT module is disposed within a first housing half and the backlighting unit is disposed within a second housing half, and in that the first housing half is connected to the second housing half by means of a plurality of mounting elements, the mounting elements having predetermined breaking points.

12 Claims, 4 Drawing Sheets

DISPLAY UNIT AND METHOD FOR PRODUCING A DISPLAY UNIT

CROSS-REFERENCE TO RELATED APPLICATION

This application claims priority to German Patent Application No. 10 2015 117 234.8 filed Oct. 9, 2015, and entitled "Display unit and method for producing a display unit," which is herein incorporated by reference.

BACKGROUND

Thin-film transistor liquid crystal displays (TFT-LCD) are a known variant of liquid crystal displays (LCD) which use thin-film transistor technology (TFT). These liquid crystal displays are used in many branches of industry and offer high image quality with good image contrast.

TFT-LCD's are also referred to as TFT modules and are used in display units in devices such as televisions, computer monitors, mobile telephones, hand-held video gaming systems, PDA's, navigation systems and projectors.

Display units including TFT modules are also used in the automobile industry as well, since they enable good readability of the displayed elements and a manipulation of the display, for example in the form of conventional digital display instruments or display instruments that are equipped with a cursor.

In addition, with TFT modules of suitable size, multiple display instruments may be provided in the display, along with additional information, such as route information in a navigation system.

In addition to the TFT module itself, such display units also comprise a backlighting unit, which is permanently connected to the TFT module. Since TFT-LCD's are non-luminous display elements, the backlighting unit ensures that light is projected from the back of the TFT module, that is to say, behind the TFT module from the point of view of the user, uniformly and over the entire surface of the LCD display, illuminating the display.

It is also customary to attach a joining layer and a front panel to the surface of the TFT module. To protect the display unit, a protective housing is used, which is connected to both the backlighting unit and the front panel.

Such a display unit is used in a vehicle, for example, and is thus exposed to a variety of strains, such as temperature changes, compressive and tensile stresses and vibrations.

Due to the rigid structure of the display unit, vibrations, for example, as well as compressive and tensile stresses which act on the protective housing also impact the front panel, the joining layer and the TFT module, and can thus lead to defects such as the Mura effect, or damage to the TFT module.

SUMMARY

The aspects disclosed herein relate to a display unit comprising at least a TFT module and a backlighting unit.

The disclosure further relates to a method for producing a display unit, in which a TFT module connected to a backlighting unit is produced, and is then connected via a joining layer to a front panel, and via the backlighting unit to a protective housing.

The object of the invention is to provide a display unit which is easy to produce and is not susceptible to compressive and tensile stresses acting on the protective housing.

The object is further to specify a method for producing a robust display unit of this type.

It is provided that the TFT module and the backlighting unit are arranged in housing halves which are independent of one another and are not connected to one another. The TFT module is disposed in a first housing half and the backlighting unit is disposed in a second housing half. To facilitate handling of these two modules during assembly of the display unit, the modules are connected to one another by means of a plurality of mounting elements. These mounting elements are equipped with predetermined breaking points, which break in the final or in one of the final steps of assembling the display unit, thereby eliminating the rigid connection between the housing halves.

By mounting the TFT module and the backlighting unit separately, a compressive or tensile load that is exerted on the protective housing is prevented from acting on the TFT module via the backlighting unit, which is connected to the protective housing, and on the joining layer and the front panel, which are connected to the TFT module. As a result, mechanical stresses in parts of the display unit, along with the Mura effect and other optical effects that result in an impairment of display properties, are prevented.

It is also advantageous to attach a joining layer and a front panel, by means of which the sensitive TFT module surface is protected, to the front surface of the TFT module. Gluing the front panel to the surface of the TFT module by means of a joining layer decreases the number of internal and external reflections that may occur on the various surfaces and improves the quality of the display. In addition, the durability of the unit is improved, thus increasing its service life, particularly in the demanding environment of a vehicle.

It is also provided for the second housing half to be connected to the protective housing by means of an adhesive or adhesive strip. The backlighting unit is thus mounted within the display unit to be produced.

To prevent dust and/or moisture from penetrating into the display unit and particularly into the region between the TFT module and the backlighting unit, a frame is positioned between the front panel and the protective housing, for example.

It is provided to connect the backlighting unit to the TFT module in such a way that the connection which is produced by means of a plurality of mounting elements can be eliminated in a final step in the assembly of the display unit. For this purpose, the mounting elements are equipped with predetermined breaking points. Pressure exerted on these mounting elements, for example, causes them to break at their predetermined breaking points. The rigid connection, which is a primary cause of stresses occurring in the display and the defects that are associated with them, is thereby eliminated.

To enable the use of these mounting elements that are equipped with predetermined breaking points, according to the invention the TFT module is disposed in a first housing half and the backlighting unit is disposed in a second housing half. The mounting elements with their predetermined breaking points are installed between these two housing halves, and hold the two housing halves together during the process of assembling the display unit.

With the display unit produced according to the invention, it is also provided that the surface of the TFT module is connected to a joining layer and a front panel.

In a further assembly step, the second housing half is attached to the protective housing, for example, by means of an adhesive or an adhesive strip.

To complete the assembly of the display unit, the first housing half, which houses the TFT module, is then pressed with the joining layer and the front panel into the protective housing. This causes the mounting elements to break at the predetermined breaking points provided for this purpose, eliminating the connection between the TFT module and the backlighting unit.

It is also provided for a frame to be installed between the front panel and the protective housing, the frame sealing off the display unit.

BRIEF DESCRIPTION OF DRAWINGS

Additional details, features and advantages of embodiments of the invention will be apparent from the following description of embodiment examples, with reference to the appended drawings. Shown are.

DETAILED DESCRIPTION

Figure 1:
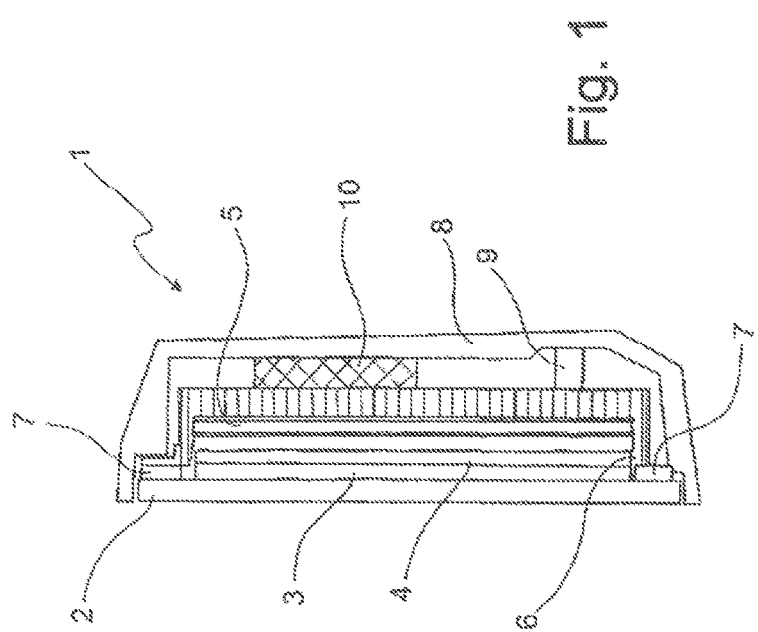
FIG. 1: an illustration of a display unit known from the prior art.

FIG. 1 shows a display unit 1 for automobile applications having an integrated front panel, according to the prior art. Assemblies of this type comprise, for example, a front panel 2, which is securely connected by means of a joining layer 3 to the surface of the TFT module 4.

TFT module 4 is typically disposed with backlighting unit 5, also referred to as the Back Light Unit (BLU), in a TFT module housing 6 and is therefore rigidly connected thereto. TFT module 4 is connected to a protective housing 8, which encompasses the entire structural unit, via joining layer 3, front panel 2, and a mounting means 7, such as a frame 7 or a latching mechanism. TFT module 4 is also connected to protective housing 8 via TFT module housing 6, for example via adhesive points or adhesive strip 10, and one or more mounting elements 9.

Figure 2:
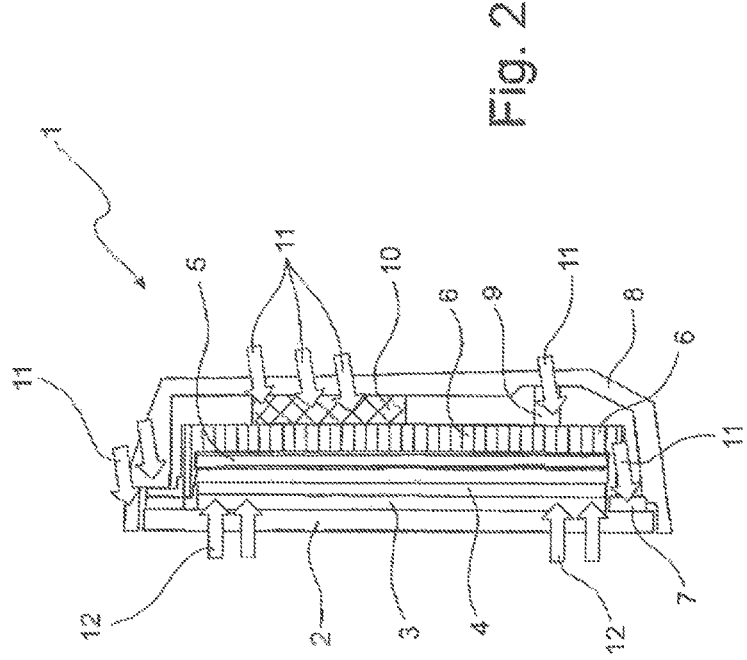
FIG. 2: an illustration of the strains and stresses acting on a display unit known from the prior art.

FIG. 2 shows display unit 1, already known from FIG. 1, with all the described parts. Strains 11, resulting, for example, from pressure exerted on protective housing 8 or from compressive and tensile forces proceeding from the points of connection of protective housing 8 to a vehicle (not shown) can cause protective housing 8 to warp.

Based on the described design of display unit 1 and tolerances in the production of TFT module 4, along with the mounting points and elements, these strains 11 can lead to stresses 12 within the modules of front panel 2, joining layer 3, TFT module 4 and backlighting unit 5. Stresses 12 in joining layer 3 in particular can lead to defects in the display, such as the Mura effect and other optical effects, which adversely affect the quality of the display.

The aspects disclosed herein solves this problem of the occurring stresses 12 in that backlighting unit 5 and its attachment to protective housing 8 is mounted mechanically separately from TFT module 4 and its attachment via joining layer 3 to front panel 2.

Figure 3:
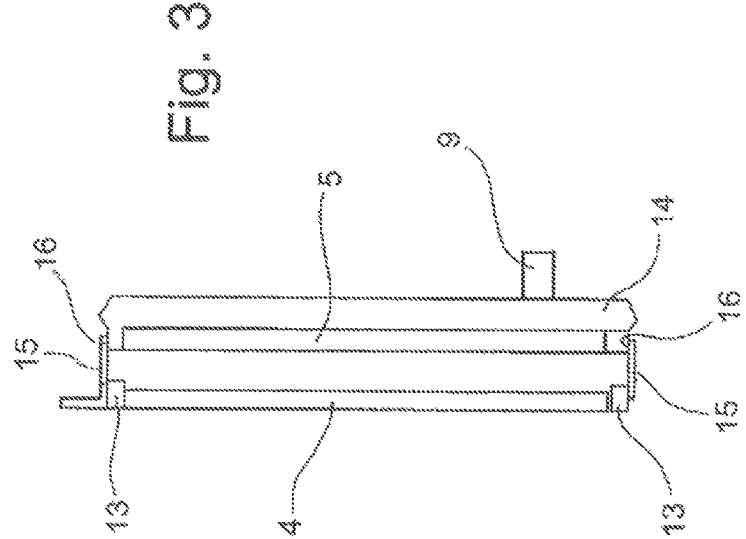
FIG. 3: an illustration of a structural unit according to the invention, consisting of a first and a second housing half.

The newly designed concept is illustrated in FIG. 3, and consists of 2 separate housing halves 13 and 14, which replace the TFT module housing 6 known from the prior art. It is provided for the separate housing halves 13 and 14 of display unit 1 to be made of different materials. For example, the front, first housing half 13, which contains TFT module 4, may be made of a plastic, while the rear, second housing half 14, which contains backlighting unit 5, is preferably made of a metal. Producing the second housing half 14 from a metal offers the advantage of better dissipation of the heat that is produced in backlighting unit 5, as compared with plastic.

The first and second housing halves 13 and 14 of TFT module housing 6 are connected to one another via a plurality of mounting elements 15. These mounting elements 15 can be designed as elements having a latch or a snap closure, and are equipped with a predetermined breaking point 16.

Provided are a plurality of mounting elements 15, which are positioned at multiple points along the periphery of TFT module housing 6. These mounting elements 15 fasten the first and second housing halves 13 and 14 at a defined distance from one another, allowing housings 13 and 14 to be treated as a single structural unit in the production process.

The handling of this structural unit and also the assembly to produce a display unit 1 are thereby substantially simplified. In addition, errors in the assembly of the module resulting from a faulty alignment of TFT module 4 in relation to backlighting unit 5 are prevented.

To connect first housing half 13 to second housing half 14, any mounting systems that are intended for a single mounting or a single use and are suitable for a defined mounting of backlighting unit 5 on TFT display 4 may be used. For example, mounting element 15 may be designed as a snap closure and may be attached at a first end to first housing half 13.

The second end of this mounting element 15 is formed such that it enables the second housing half 14 to be snapped or latched in place. For example, during the process of producing display unit 1, the two housing halves 13 and 14 are pressed against one another until the second housing half 14 latches in place into mounting elements 15 and the structural unit is completed.

Figure 4:
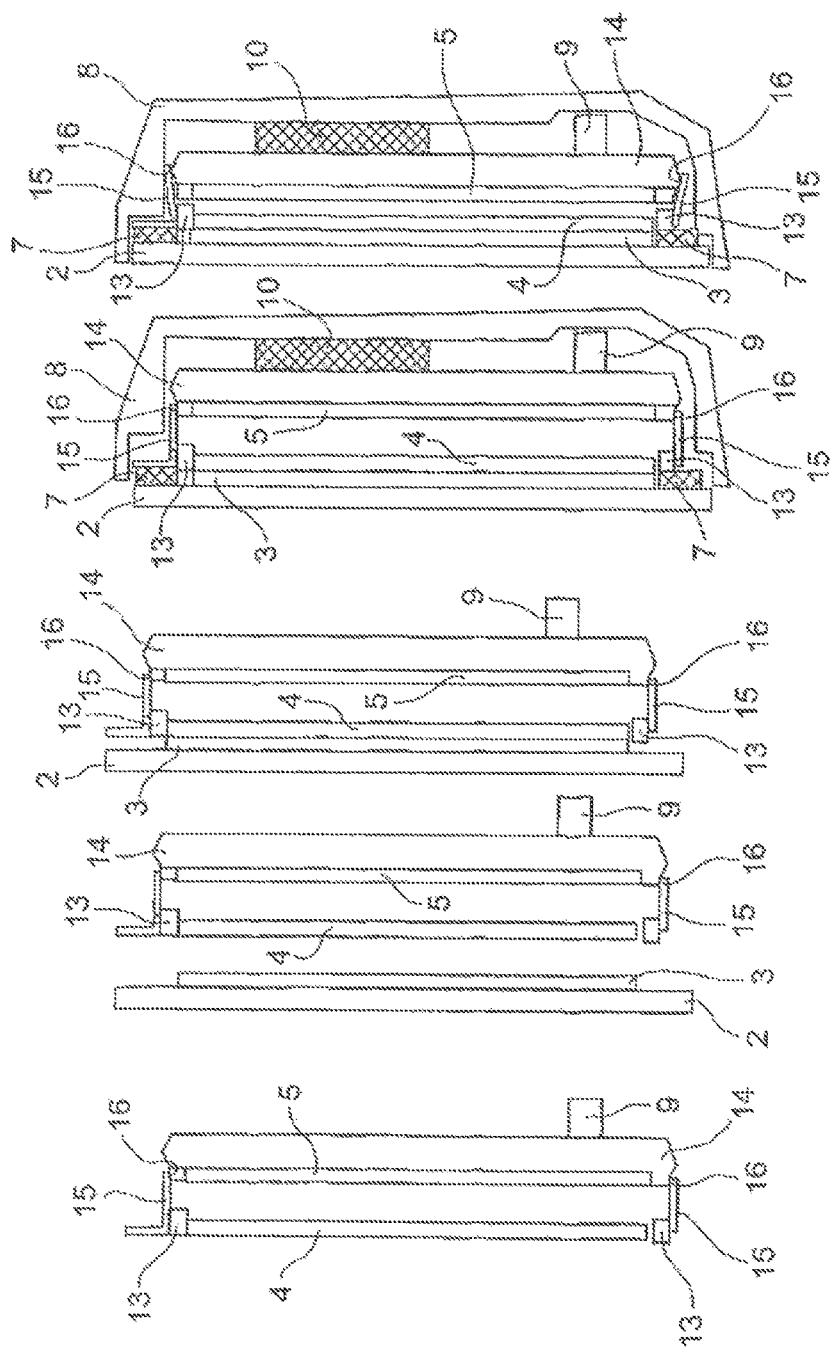
FIG. 4: an illustration of three manufacturing steps in the production of the display unit according to the invention.

FIG. 4 illustrates the production of display unit 1 according to the aspects disclosed herein in three different production steps.

The left portion of FIG. 4 shows the finished structural unit, consisting of front, first housing half 13 with TFT module 4 and rear, second housing half 14 with backlighting unit 5. The two housing halves 13 and 14 are joined to one another by means of a plurality of mounting elements 15, only two of which are shown, by way of example, in each production stage illustrated in FIG. 4. Also shown is a fastening element 9 attached to second housing part 14, by means of which, in a subsequent production step, a connection to protective housing 8 is produced.

The center portion of FIG. 4 shows the process of joining TFT module 4 to front panel 2 using a joining layer 3, for example by gluing the layers to one another. The diagrams show front panel 2 with joining layer 3 first in a variant in which it is spaced from TFT module 4, and then in a state in which front panel 2 is joined to TFT module 4 by means of joining layer 3. In this production step, no change is made to the structural unit consisting of the first and second housing halves 13 and 14.

The right portion of FIG. 4 shows the production step of adding protective housing 8 to the partial display unit shown in the center diagrams of FIG. 4, consisting of the first housing part with front panel 2, joining layer 3 and TFT module 4, and second housing part 14 with backlighting unit 5.

This process is illustrated in two partial steps, wherein, in the first partial step, protective housing 8 is connected by means of an adhesive or adhesive strip 10 to second housing part 14. In this process, fastening element 9 may be used for aligning protective housing 8 in relation to second housing part 14. In this partial step, at least front panel 2 is not yet located within the protective area of protective housing 8, as is shown in the diagram in the right portion of FIG. 4.

Once second housing part 14 has been joined to protective housing 8, first housing part 13 is pressed into protective housing 8, for example by pressing on front panel 2. In this process, mounting elements 15 break at their predetermined breaking points 16, allowing first housing part 13 to be pushed into protective housing 8.

The process of breaking mounting elements 15 at their predetermined breaking points 16 eliminates the mechanical connection between the two housing parts 13 and 14. As a result, no further stresses 12 are transferred between the housing parts, and the occurrence of defects in the display is prevented.

By breaking mounting elements 15 at their predetermined breaking points 16 and pressing first housing part 13 into protective housing 8, the distance between TFT module 4 and backlighting unit 5 is decreased. Suitable design measures ensure that the modules can be moved toward one another only up to a defined minimal distance, and that mutual mechanical contact is prevented.

The penetration of dust and moisture into the display unit is also prevented by the attachment of corresponding means, for example a seal.

The invention claimed is:

1. A method for producing a display unit, comprising:
    providing a thin-film transistor (TFT) module:
    connecting a backlighting unit to the TFT module,
    connecting the TFT module to a joining layer, a front panel;
    connecting the backlighting unit to a protective housing, wherein
    the TFT module connection to the backlighting unit is provided at least indirectly with a connection to the backlighting unit and has a predetermined breaking point;
    breaking the mounting element in response to connecting the backlighting unit to the protective housing; and
    eliminating a rigid mechanical connection between the TFT module and the backlighting unit to prevent stresses being transferred between the TFT module and the backlighting unit.

2. The method according to claim 1, wherein the TFT module is provided installed in a first housing half and the backlighting unit is provided installed in a second housing half.

3. The method according to claim 2, wherein the connection having a predetermined breaking point between the first and second housing halves is provided by a mounting element.

4. The method according to claim 2, wherein the second housing half is attached to a protective housing, and in that the first housing halt: along with the joining layer and the front panel is then pressed into the protective housing.

5. The method according to claim 2, wherein the step of connecting the backlighting unit to the TFT module includes the steps of:
    pressing the first housing half against the second housing half; and
    latching the mounting element to at least one of the first housing half and the second housing half.

6. The method according to claim 1, wherein a joining layer and a front panel are attached to a surface of the TFT module.

7. An apparatus, comprising:
    a thin-film transistor (TFT) module;
    a backlighting unit connected to the TFT module;
    a joining layer connected to the TFT module;
    a front panel connected to the TFT module;
    a protective housing connected to the backlighting unit, wherein
    the TFT module connection to the backlighting unit is provided at least indirectly with a connection to the backlighting unit and has a predetermined breaking point;
    wherein the mounting element is configured to break in response to connecting the backlighting unit to the protective housing; and
    wherein a rigid mechanical connection between the TFT module and the backlighting unit is eliminated to prevent stresses being transferred between the TFT module and the backlighting unit.

8. The apparatus according to claim 7, wherein a joining layer and a front panel are attached to a surface of the TFT module.

9. The apparatus according to claim 7, wherein the TFT module is installed in a first housing half and the backlighting unit is installed in a second housing half.

10. The apparatus according to claim 9, wherein a mounting element provides the connection having a predetermined breaking point between the first and second housing halves.

11. The apparatus according to claim 9, wherein the second housing half is attached to a protective housing, and the first housing half, along with the joining layer and the front panel, is pressed into the protective housing.

12. The apparatus according to claim 9, wherein the backlighting unit is connected to the TFT module by pressing the first housing half against the second housing half and latching the mounting element to at least one of the first housing half and the second housing half.

* * * * *